US008438133B2

(12) United States Patent
Taniguchi

(10) Patent No.: US 8,438,133 B2
(45) Date of Patent: May 7, 2013

(54) INFORMATION PROCESSING APPARATUS, FILE MANAGEMENT SYSTEM, INFORMATION PROCESSING METHOD AND COMPUTER READABLE MEDIUM

(75) Inventor: Shinichiro Taniguchi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 281 days.

(21) Appl. No.: 12/552,319

(22) Filed: Sep. 2, 2009

(65) Prior Publication Data

US 2010/0228801 A1    Sep. 9, 2010

(30) Foreign Application Priority Data

Feb. 23, 2009  (JP) .................................. 2009-039420

(51) Int. Cl.
*G06F 7/00* (2006.01)
*G06F 17/00* (2006.01)

(52) U.S. Cl.
USPC ........................... 707/640; 707/826; 707/827

(58) Field of Classification Search .................. 707/826, 707/E17.005, E17.01, 802, 640, 827
See application file for complete search history.

(56) References Cited

U.S. PATENT DOCUMENTS

| | | | | |
|---|---|---|---|---|
| 5,544,359 A * | 8/1996 | Tada et al. | ....................... | 707/682 |
| 6,826,593 B1 * | 11/2004 | Acharya et al. | ................ | 709/203 |
| 7,243,122 B2 * | 7/2007 | Acharya et al. | ................ | 709/203 |
| 7,278,106 B1 * | 10/2007 | Mason | ........................... | 715/744 |
| 7,809,777 B2 * | 10/2010 | Dodge | ........................... | 707/826 |
| 7,908,246 B2 * | 3/2011 | Anglin et al. | ................. | 707/625 |
| 7,953,945 B2 * | 5/2011 | Bender et al. | ................. | 711/161 |
| 2002/0107886 A1 * | 8/2002 | Gentner et al. | ................ | 707/511 |
| 2004/0199577 A1 * | 10/2004 | Burd et al. | ..................... | 709/203 |
| 2005/0021570 A1 * | 1/2005 | Thompson | .................... | 707/200 |
| 2005/0065999 A1 * | 3/2005 | Acharya et al. | ................ | 709/203 |

(Continued)

FOREIGN PATENT DOCUMENTS

| | | |
|---|---|---|
| JP | 2006-092149 A | 4/2006 |
| JP | 2006-276902 A | 10/2006 |
| JP | 2008-102827 A | 5/2008 |

OTHER PUBLICATIONS

Nguyen, Tien N., et al., "Flexible Fine-grained Version Control for Software Documents", APSEC '04, Busan, Korea, Nov. 30-Dec. 2004, pp. 212-219.*

(Continued)

*Primary Examiner* — Phong Nguyen
(74) *Attorney, Agent, or Firm* — Sughrue Mion, PLLC

(57) ABSTRACT

An information processing apparatus includes a file obtaining unit, a saving unit, a save-state information storage unit, an accepting unit, an updating unit, and a transmitting unit. The file obtaining unit obtains a first file from a file management apparatus that manages the first file. The saving unit saves the first file. The save-state information storage unit stores save-state information about a save state of the first file. The accepting unit accepts a manipulation performed on the first file saved in the saving unit. The updating unit updates the save-state information, when the save state of the first file is changed in response to the accepted manipulation. The transmitting unit transmits the save-state information to the file management apparatus.

17 Claims, 15 Drawing Sheets

U.S. PATENT DOCUMENTS

2005/0193245 A1*  9/2005   Hayden et al. ................... 714/13
2005/0289381 A1* 12/2005   Yeo ................................... 714/1
2006/0288056 A1* 12/2006   Yamakawa et al. ............ 707/203
2009/0228530 A1*  9/2009   Anglin et al. .................. 707/204
2009/0249005 A1* 10/2009   Bender et al. .................. 711/162
2010/0293141 A1* 11/2010   Anand et al. ................... 707/640
2010/0306178 A1* 12/2010   Anglin et al. .................. 707/674
2011/0016094 A1*  1/2011   Chase et al. ................... 707/685

OTHER PUBLICATIONS

Notification of Reasons for Refusal issued Feb. 22, 2011 in counterpart Japanese Application No. 2009-039420, 4 pages.

* cited by examiner

FIG. 6

SAVE-STATE INFORMATION

| FILE ID | TAKE-OUT DATE AND TIME | TAKE-OUT SOURCE | TAKE-OUT DESTINATION | FILE SIZE | SAVE DATE AND TIME |
|---|---|---|---|---|---|
| A00111 | 2008/09/01 10:00:00 | ¥¥serverA¥doc¥file1.txt | ¥¥pc1¥folder1¥file1.txt | 10KB | 2008/09/01 10:00:00 |

LOG INFORMATION

| MANIPULATION DATE AND TIME | MANIPULATION TARGET | MANIPULATION | |
|---|---|---|---|
| 2008/09/01 10:00:00 | ¥¥pc1¥folder1¥file1.txt | copy ¥¥serverA¥doc¥file1.txt ¥folder1 | 41 |
| 2008/09/01 10:00:02 | ¥¥pc1¥folder1¥file1.txt | protect pid=001 did=00000001 ¥¥pc1¥folder1¥file1.txt | 42 |
| 2008/09/01 10:10:12 | ¥¥pc1¥folder1¥file1.txt | open ¥folder1¥file1.txt | 43 |
| 2008/09/01 10:50:18 | ¥¥pc1¥folder1¥file1.txt | close ¥folder1¥file1.txt | 44 |
| 2008/09/01 11:00:00 | ¥¥pc1¥folder1¥file1.txt | rename ¥folder1¥file1.txt ¥folder1¥file2.txt | 45 |
| 2008/09/01 12:00:00 | ¥¥pc1¥folder1¥file2.txt | copy ¥folder1¥file2.txt ¥folder2 | 46 |
| 2008/09/01 13:00:00 | ¥¥pc1¥folder1¥file2.txt | delete ¥folder1¥file2.txt | 47 |

FIG. 10

SAVE-STATE INFORMATION

| FILE ID | TAKE-OUT DATE AND TIME | TAKE-OUT SOURCE | TAKE-OUT DESTINATION | FILE SIZE | SAVE DATE AND TIME |
|---|---|---|---|---|---|
| A00111 | 2008/09/01 10:00:00 | ¥¥serverA¥doc¥file1.txt | ¥¥pc1¥folder1¥file1.txt | 14KB | 2008/09/01 10:50:18 |

SAVE-STATE INFORMATION

| FILE ID | TAKE-OUT DATE AND TIME | TAKE-OUT SOURCE | TAKE-OUT DESTINATION | FILE SIZE | SAVE DATE AND TIME |
|---|---|---|---|---|---|
| A00111 | 2008/09/01 10:00:00 | ¥¥serverA¥doc¥ file1.txt | ¥¥pc1¥folder1 ¥file2.txt | 14KB | 2008/09/01 11:00:00 |

SAVE-STATE INFORMATION

| FILE ID | TAKE-OUT DATE AND TIME | TAKE-OUT SOURCE | TAKE-OUT DESTINATION | FILE SIZE | SAVE DATE AND TIME |
|---|---|---|---|---|---|
| A00111 | 2008/09/01 10:00:00 | ¥¥serverA¥doc¥file1.txt | ¥¥pc1¥folder1¥file2.txt | 14KB | 2008/09/01 11:00:00 |
| | | | ¥¥pc1¥folder2¥file2.txt | 14KB | 2008/09/01 12:00:00 |

FIG. 13

SAVE-STATE INFORMATION

| FILE ID | TAKE-OUT DATE AND TIME | TAKE-OUT SOURCE | TAKE-OUT DESTINATION | FILE SIZE | SAVE DATE AND TIME |
|---|---|---|---|---|---|
| A00111 | 2008/09/01 10:00:00 | ¥¥serverA¥doc¥file1.txt | ¥¥pc1¥folder2¥file2.txt | 14KB | 2008/09/01 11:00:00 |

36

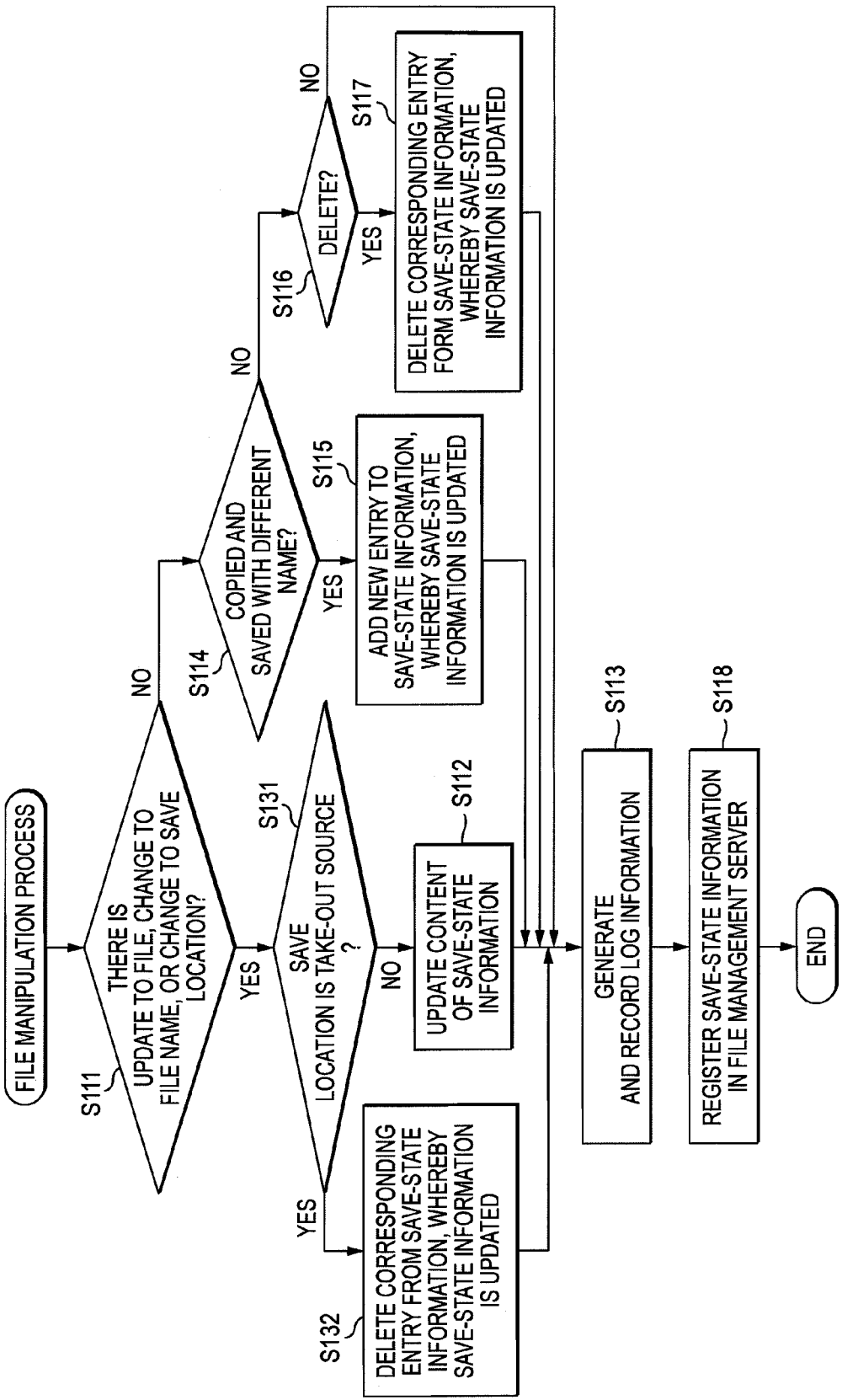

INFORMATION PROCESSING APPARATUS, FILE MANAGEMENT SYSTEM, INFORMATION PROCESSING METHOD AND COMPUTER READABLE MEDIUM

CROSS-REFERENCE TO RELATED APPLICATIONS

This application is based on and claims priority under 35 U.S.C. 119 from Japanese Patent Application No. 2009-39420, filed on Feb. 23, 2009.

BACKGROUND

Technical Field

The present invention relates to an information processing apparatus, a file management system, an information processing method and a computer readable medium.

SUMMARY

According to an aspect of the present invention, an information processing apparatus includes a file obtaining unit, a saving unit, a save-state information storage unit, an accepting unit, an updating unit, and a transmitting unit. The file obtaining unit obtains a first file from a file management apparatus that manages the file. The saving unit saves the first file. The save-state information storage unit stores save-state information about a save state of the first file. The accepting unit accepts a manipulation performed on the first file saved in the saving unit. The updating unit updates the save-state information, when the save state of the first file is changed in response to the accepted manipulation. The transmitting unit transmits the save-state information to the file management apparatus.

BRIEF DESCRIPTION OF THE DRAWINGS

Exemplary embodiments of the present invention will be described in detail based on the following figures, wherein:

FIG. 6 is a diagram showing an exemplary data configuration of save-state information stored in a save-state information storage unit according to the exemplary embodiment;

FIG. 7 is a diagram showing exemplary data configurations of log information stored in a log information storage unit according to the exemplary embodiment;

FIG. 10 is a diagram showing an exemplary data setting of save-state information updated by a file update process, according to the exemplary embodiment;

FIG. 11 is a diagram showing an exemplary data setting of save-state information updated by a file name change process, according to the exemplary embodiment;

FIG. 12 is a diagram showing an exemplary data setting of save-state information updated by copying a file with a different name, according to the exemplary embodiment;

FIG. 13 is a diagram showing an exemplary data setting of save-state information updated by a file deletion process, according to the exemplary embodiment;

FIG. 15 is a flowchart showing another file manipulation process according to the exemplary embodiment.

DETAILED DESCRIPTION

Exemplary embodiments of the present invention will be described with reference to the drawings hereinafter.

Figure 1:
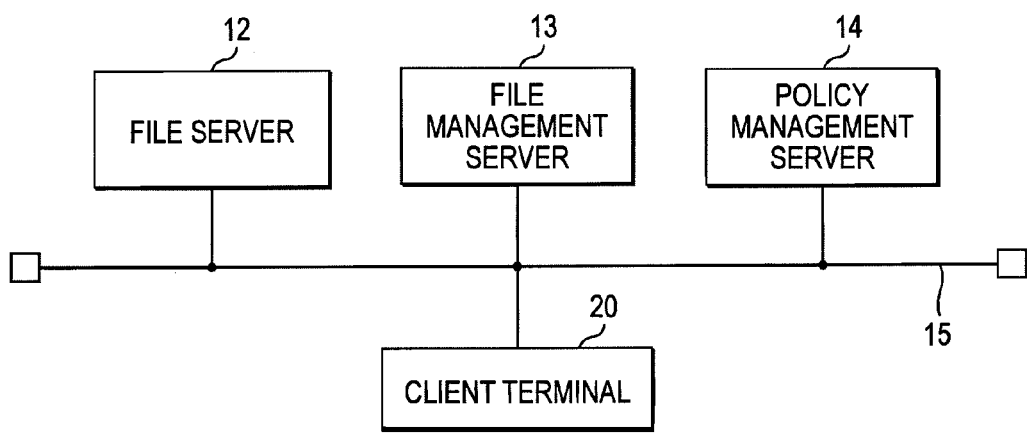
FIG. 1 is an overall configuration diagram of a file management system according to an exemplary embodiment of the present invention.

FIG. 1 is an overall configuration diagram of a file management system according to the exemplary embodiment. As shown in FIG. 1, the file management system includes: a client terminal 20 serving as an information processing apparatus in the present invention; a file server 12 that manages a file provided to the client terminal 20; a file management server 13 that manages the file; and a policy management server 14 that sets and manages a policy of the file. The client terminal 20, the file server 12, the file management server 13 and the policy management server 14 are connected to one another through a network 15.

Figure 2:
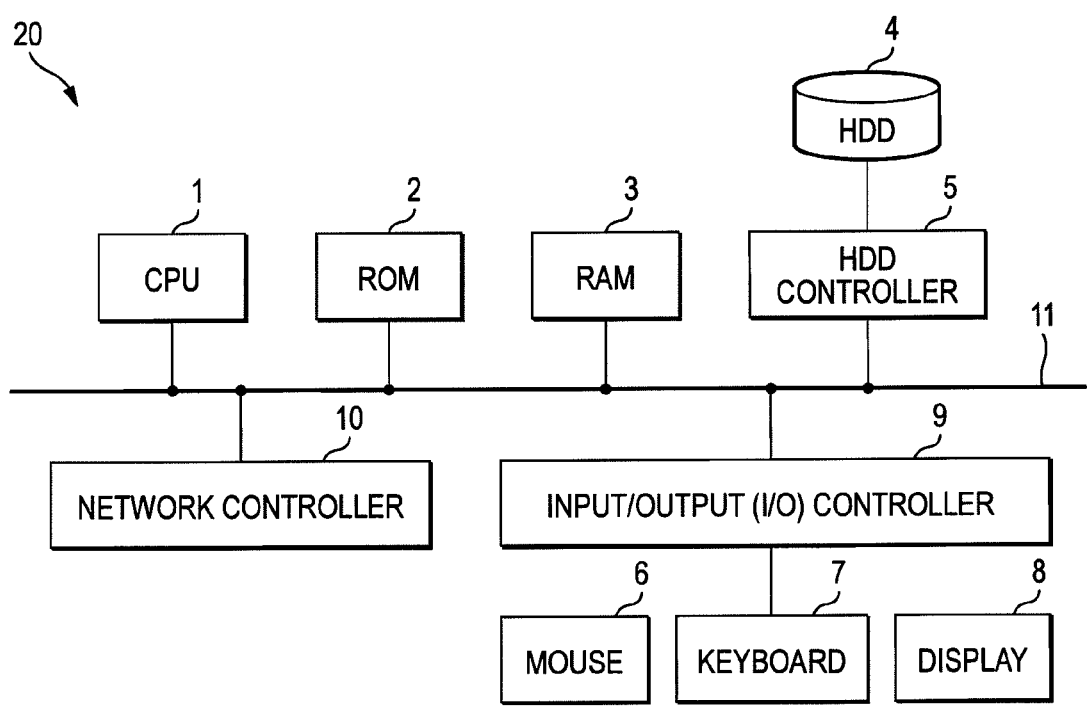
FIG. 2 is a hardware configuration diagram of a computer that configures a client terminal according to the exemplary embodiment.

FIG. 2 is a hardware configuration diagram of a computer that configures the client terminal 20 according to the exemplary embodiment. The client terminal 20 may be general-purpose personal computer and can be implemented by a general hardware configuration. Specifically, as shown in FIG. 2, the client terminal 20 is configured by: a CPU 1; a ROM 2; a RAM 3; an HDD controller 5 connected to a hard disk drive (HDD) 4; an input/output (I/O) controller 9 connected to a mouse 6 and a keyboard 7 provided as input units and also connected to a display 8 provided as a display apparatus; and a network controller 10 provided as a communicating unit, which are connected to each other through an internal bus 11.

The file server 12, the file management server 13, and the policy management server 14 are also computers, and thus the hardware configuration thereof can be shown in the same manner as that in FIG. 2. Also, the functions of the file server 12, the file management server 13, and the policy management server 14 may be operated on a single computer.

Figure 3:
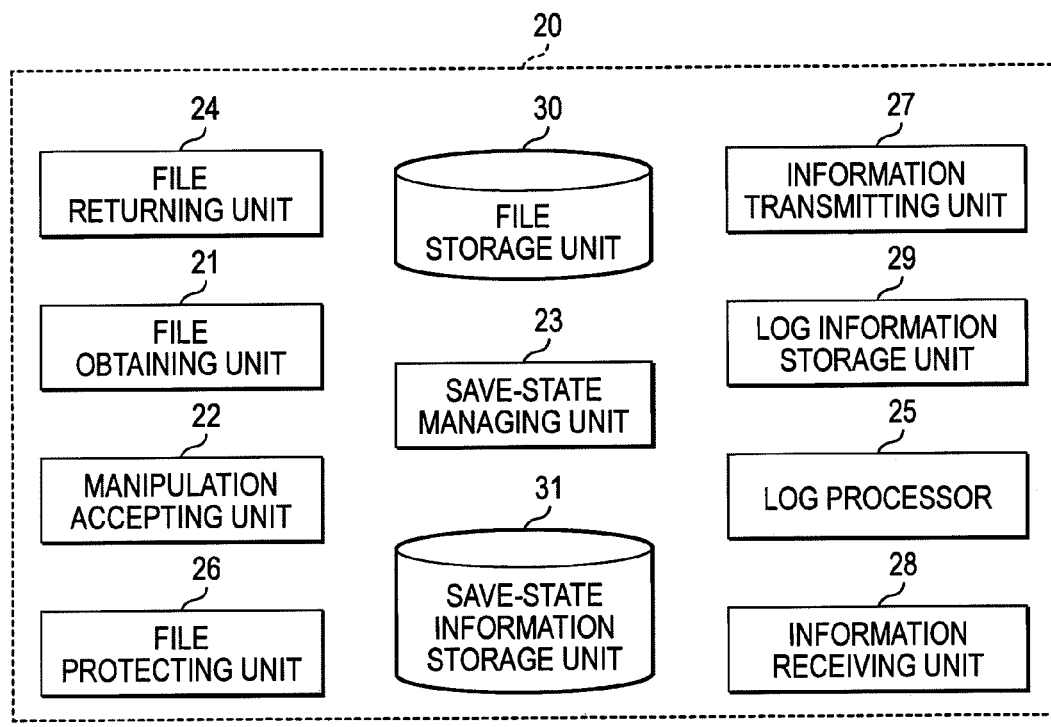
FIG. 3 is a functional block configuration diagram of the client terminal according to the exemplary embodiment.

FIG. 3 is a functional block configuration diagram of the client terminal 20 according to the exemplary embodiment. The client terminal 20 includes: a file obtaining unit 21; a manipulation accepting unit 22; a save-state managing unit 23; a file returning unit 24; a log processor 25; a file protecting unit 26; an information transmitting unit 27; an information receiving unit 28; a log information storage unit 29; a file storage unit 30; and a save-state information storage unit 31. The file obtaining unit 21 obtains a file (hereinafter, also referred to as a "take-out file") such that the file is copied from the file server 12 which is a file provider, to the client terminal 20. The manipulation accepting unit 22 accepts a manipulation performed on a file stored in the file storage unit 30. The save-state managing unit 23 updates save-state information of the take-out file which is registered in the save-state information storage unit 31, in response to a change in the save state of the file by performing file processing on the file according to an accepted manipulation instruction (e.g., movement, an update, deletion of the file). The file returning unit 24 moves the take-out file to the file server 12 which is the file provider, in response to an accepted return instruction. The log processor 25 generates log information about an accepted file manipulation and stores the log information in the log information storage unit 29. The file protecting unit 26 protects the take-out file by, for example, performing policy setting and encryption on the take-out file. The information transmitting unit 27 transmits at least one of information stored in the save-state information storage unit 31 and information stored in the log information storage unit 29, to a printer (not shown) or another computer through the network 15. The information receiving unit 28 receives information from another computer through the network 15. For example, the information receiving unit 28 can receive a result as to whether information transmitted from the information transmitting unit 27 has been normally transmitted to a destination. The file storage unit 30 saves the take-out file obtained by the file obtaining unit 21. The file storage unit 30 also saves a file derived from the take-out file. The save-state information storage unit 31 stores information about the saving of the take-out file and the file derived from the take-out file stored in the file storage unit 30. The log information storage unit 29 stores log information about manipulations performed on the files stored in the file storage unit 30.

Figure 4:
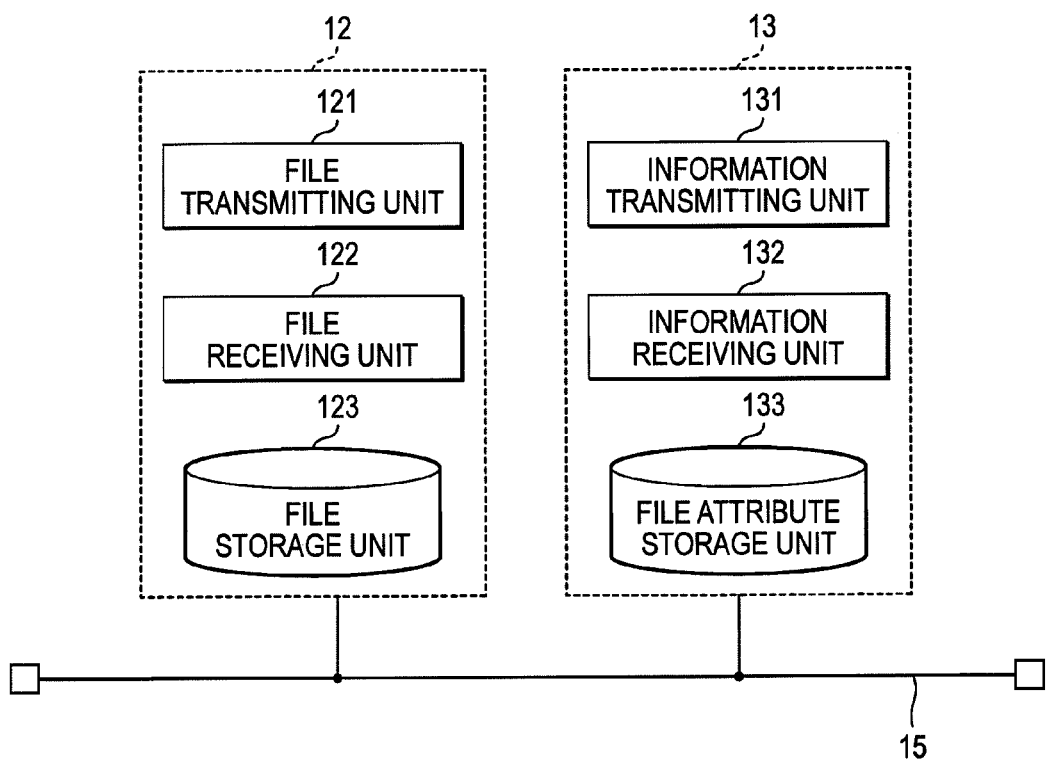
FIG. 4 is a functional block configuration diagram of a file server and a file management server according to the exemplary embodiment.

FIG. 4 is a functional block diagram of the file server 12 and the file management server 13 according to the exemplary embodiment. A file storage unit 123 of the file server 12 stores files such as document files. A file transmitting unit 121 and a file receiving unit 122 transmits and receives a file through the network 15, in response to a request from the client terminal 20. A file attribute storage unit 133 of the file management server 13 manages the attributes of files stored in the file server 12. An information transmitting unit 131 and an information receiving unit 132 transmits and receives file attribute information. The functions of the file server 12 and the file management server 13 may be collectively performed on a single server.

Figure 5:
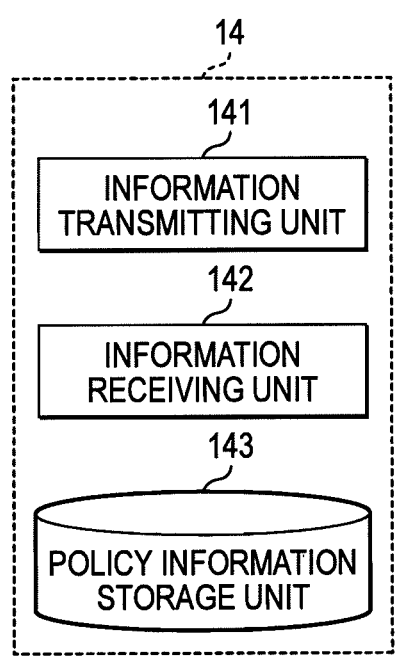
FIG. 5 is a functional block configuration diagram of a policy management server according to the exemplary embodiment.

FIG. 5 is a functional block diagram of the policy management server 14 according to the exemplary embodiment. A policy information storage unit 143 stores public keys and secret keys of a public-key cryptosystem on a policy-by-policy basis for a file protection process. An information transmitting unit 141 and an information receiving unit 142 transmit and receive a public key and a secret key according to a use mode.

The components 21 to 28 of the client terminal 20 are implemented by cooperative operation of a computer that configures the client terminal 20 and a program that runs on the CPU 1 mounted on the computer. The storage units 29 to 31 are implemented by the HDD 4 mounted on the client terminal 20. In each of the file server 12, the file management server 13, and the policy management server 14, similarly, the components are implemented in the same manner as those described above and the storage units 123, 133, and 143 of the respective servers are implemented by the respective HDDs 4.

A program to be used in the exemplary embodiment can be provided not only by the communicating unit but also by a computer-readable recording medium such as a CD-ROM or DVD-ROM. For example, the program is installed on a computer and then is sequentially executed by a CPU in the computer, so that various functions are implemented.

FIG. 6 is a diagram showing an exemplary data configuration of save-state information stored in the save-state information storage unit 31, according to the exemplary embodiment. Save-state information is recorded for each take-out file and is information about the saving of the take-out file and is identified by identification information (file ID) of the file. The save-state information is updated when the save state of the take-out file is changed. The save-state information includes: time information for when the file is taken out, i.e., "take-out date and time" indicating the time when a copy of the file is downloaded from a file provider; a "take-out source" that identifies a storage destination, in the file provider, of the file; a "take-out destination" that identifies a storage destination, in the client terminal 20, of the file obtained from the file provider; and a "file size" and "save date and time" for when the file is saved. When the take-out file is updated or when a file derived from the take-out file is created, a change in the save state of the take-out file can be grasped. Since save-state information is created for each take-out file, it can be said that a list of take-out files is created in the save-state information storage unit 31. Thus, it can also be said that a "file list" of take-out files is set in the save-sate information storage unit 31.

FIG. 7 is a diagram showing exemplary data configurations of log information stored in the log information storage unit 29 according to the exemplary embodiment. Log information is generated whenever a manipulation is performed on a take-out file or a file derived from the take-out file, and then recorded in the log information storage unit 29. The log information includes: "manipulation date and time" indicating the date and time when a file is manipulated; a "manipulation target" that identifies a manipulated file; and "manipulation" that identifies the content of a manipulation performed on the file.

Figure 8:
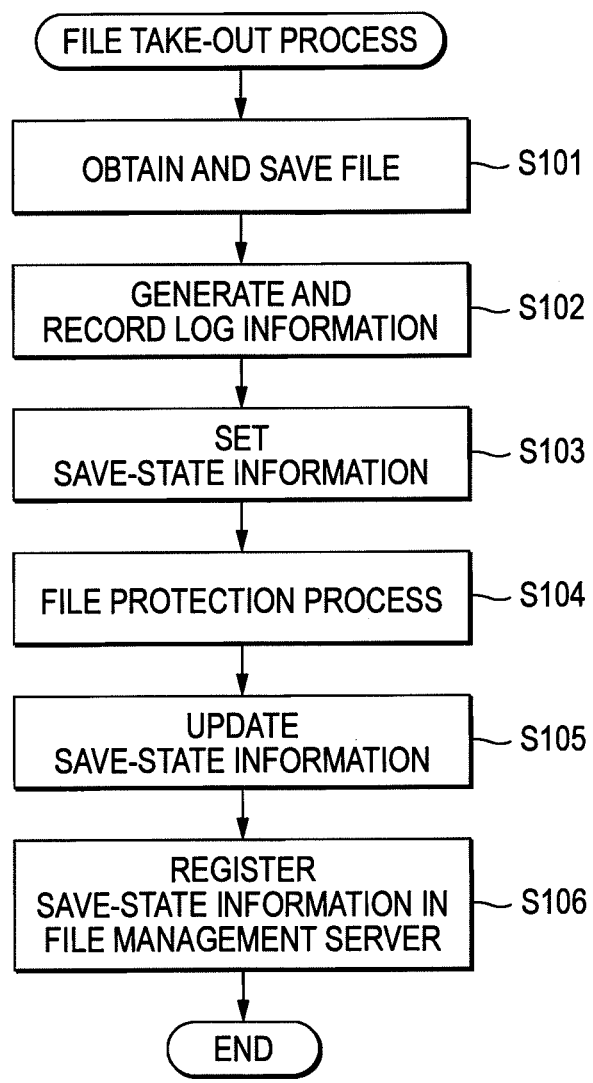
FIG. 8 is a flowchart showing a file take-out process according to the exemplary embodiment.

Next, operations according to the exemplary embodiment will be described. First, respective operations performed when a file stored in the file server 12 is copied and taken out will be described with reference to a flowchart shown in FIG. 8.

When a user of the client terminal 20 manipulates the file obtaining unit 21 to specify a file to be taken out of the file server 12, the file obtaining unit 21 obtains the specified file from the file server 12 through the network 15 and writes the file in the file storage unit 30 (step S101). In response to the file obtaining manipulation, the log processor 25 generates log information. Here, the log information includes: the manipulation date and time when the file is obtained; the file that is a target for the obtaining manipulation; and the content of the obtaining manipulation. Then, the log processor 25 registers the log information in the log information storage unit 29, whereby a log is recorded (step S102). FIG. 7 shows an exemplary setting of log information 41 accumulated in the log information storage unit 29 by this operation. However, at this point in time, pieces of log information 42 to 47 are not yet registered. Also, the save-state managing unit 23 generates save-state information. Here, the save-state information includes: the date and time when the file is taken out to the client terminal 20; a file ID that uniquely identifies the file on the file server 12; a location where the file has been saved; a location where the file is to be stored by take-out; the save date and time; and a file size. Then, the save-state managing unit 23 registers the save-state information in the save-state information storage unit 31 (step S103). As such, whenever a file is newly taken out, new save-state information is set and registered. FIG. 6 shows an exemplary setting of save-state information 32 accumulated in the save-state information storage unit 31 through this operation. By referring to the save-state information 32, it can be grasped that the file "¥¥serverA¥doc¥file1.txt" taken out of the file server 12 is saved on the client terminal 20 and has a storage destination and a file name as "¥¥pc1¥folder1¥file1.txt".

Subsequently, the file protecting unit 26 protects the file thus obtained from the file server 12 in the following manner (step S104). For example, the information receiving unit 28 of the client terminal 20 obtains a cryptographic public key and applicable policy candidates from the policy management server 14. Then, the file protecting unit 26 encrypts a file obtained through the file obtaining unit 21, using the public key. Furthermore, the user selects a policy to be applied to the file from among the obtained policy candidates. When the file protecting unit 26 transmits a file ID of the encrypted file to the policy management server 14 through the information transmitting unit 27 of the client terminal 20, the policy management server 14 registers the transmitted file ID in association with the selected policy. Thereafter, the file protecting unit 26 makes a request to the policy management server 14 and thereby obtains a license for the file, and saves the license in a storage unit (not shown). When a protection process is performed on the file in the above-described manner, the log processor 25 generates log information. Here, the log information includes: the date and time when the file protection process is performed; the file that is a protection target; and the content of a manipulation of performing file protection. Then, the log processor 25 registers the log information in the log information storage unit 29, so that a log is recorded. FIG. 7 shows an exemplary setting of log information 42 accumulated in the log information storage unit 29 by this operation. Through the file protection process, a change is made to the save state of the file and thus the save-state information is also updated (step S105).

The client terminal 20 transmits the save-state information to the file management server 13 and the save-state information is registered in the file attribute storage unit 133 (step S106).

A file take-out process according to the exemplary embodiment is as described above. Whether to perform a file protection process at operation S104 can be selected by the user. If operation S104 is not performed, operation S105 does not need to be performed, either.

Next, respective operations performed when a file manipulation has been performed by the client terminal 20 will be described using a flowchart shown in FIG. 9.

It is assumed that the user of the client terminal 20 has performed such a manipulation on the take-out file that changes the save state of the file, such as movement of a save location, changing of a file name, an update to the file, copying of the file, or deletion of the file. If a manipulation accepted by the manipulation accepting unit 22 is an update to the file or a change to the file name or the save location ("Y" at step S111), the save-state managing unit 23 updates the save-state information 32 of the take-out file registered in the save-state information storage unit 31, according to the content of the accepted manipulation (step S112).

It is assumed that the content of the accepted manipulation is an update to the file. In this case, the take-out file is read from the file storage unit 30 by a predetermined application and edited by the user and then overwritten and saved. In this case, as shown in FIG. 7, in response to the file being read from the file storage unit 30, the log processor 25 generates log information 43 and registers the log information 43 in the log information storage unit 29. Also, in response to the file being overwritten and saved in the file storage unit 30 and the application being ended, the log processor 25 generates log information 44 and registers the log information 44 in the log information storage unit 29. When the edited file is saved in the file storage unit 30, the save-state managing unit 23 updates the save-state information 32 with the file size and save date and time of the saved file. An example of the save-state information 32 thus updated as a result of an update to the file is shown in FIG. 10.

An example of save-state information 32 for when the content of the accepted manipulation is a change to the file name is shown in FIG. 11. As exemplified in FIG. 11, "¥¥pc1¥folder1file1.txt" that has been included in the save-state information 32 is changed to "¥¥pc1¥folder1¥file2.txt" by a change to the file name. Then, the log processor 25 generates log information. Here, the log information includes: the manipulation date and time when a manipulation is performed to change the file name; the file that is a manipulation target; and the content of a manipulation of changing the file name. Then, the log processor 25 registers the log information in the log information storage unit 29, so that a log is recorded (step S113). FIG. 7 shows an exemplary setting of log information 45 accumulated in the log information storage unit 29 by this operation.

Herein, a change to the file name is shown as an example and thus in FIG. 11 the file name "file1.txt" in "¥pc1¥folder1¥file1.txt" is changed to "file2.txt"; however, when a change is made to the save location, the portion "¥pc1¥folder1" is changed and updated. For an example of an update to the file, the file size and the save date and time in the save-state information 32 are updated.

If a manipulation accepted by the manipulation accepting unit 22 is not a change to the file name or the save location of the file ("N" at step S111) and the file is copied and saved with a different name ("Y" at step S114), the save-state managing unit 23 adds a new entry to the "take-out destination" in the save-state information 32 exemplified in FIG. 11 and thereby updates the save-state information (step S115). FIG. 12 shows an example of save-state information 34 in which a new entry 33 is added when the existing "¥pc1¥folder1file2.txt" is copied, whereby "¥pc1¥folder2¥file2.txt" is created. The log processor 25 generates log information that includes: the manipulation date and time when the copy manipulation is performed on the file; the file that is a manipulation target; and the content of a manipulation of copying the file, and then registers the log information in the log information storage unit 29, whereby a log is recorded (step S113). FIG. 7 shows an exemplary setting of log information 46 accumulated in the log information storage unit 29 by this operation.

If a manipulation accepted by the manipulation accepting unit 22 is not a change to the file name or the save location of the file ("N" at operation S111) and the file is not copied and saved with a different name ("N" at operation S114) but is deleted ("Y" at operation 116), then the save-state managing unit 23 deletes an entry in the "take-out destination" in the save-state information 34 exemplified in FIG. 12 that corresponds to the deleted file and thereby updates the save-state information (step S117). FIG. 13 shows an example of save-state information 36 that is changed by deleting an entry 35 "¥pc1¥folder1¥file2.txt" in the save-state information 34 shown in FIG. 12. The log processor 25 generates log information. Here, the log information includes: the manipulation date and time when the deletion manipulation is performed on the file; the file that is a delete target; and the content of a manipulation of deleting the file. Then, the log processor 25 registers the log information in the log information storage unit 29, whereby a log is recorded (step S113). FIG. 7 shows an exemplary setting of log information 47 accumulated in the log information storage unit 29 by this operation.

Finally, the updated save-state information in the client terminal 20 is transmitted to the file management server 13 and registered in the file attribute storage unit 133 (step S118). Through this operation, without checking the save-state information in the client terminal 20, only by checking the information registered in the file attribute storage unit 133 of the file management server 13, the state of the take-out file can be checked.

Upon a file manipulation, save-state information before an update and a file before an update are temporarily saved. When registration of save-state information is not normally performed at operation S118, a target save-state information and a target file may be brought back to a state before an update and a change made to a file save state by the file manipulation may be cancelled. When the client terminal 20 receives a notification of normal completion from the file management server 13 at operation S118, the save-state information before an update and the file before an update that are temporarily saved are deleted.

Also, when the aforementioned manipulations such as movement of a save location of a file, changing of a file name, an update to the file, copying of the file, saving of the file with a different name, and deletion are not successful, an update to save-state information or registration of log information does not need to be performed. In this case, an error log may be additionally recorded. Such an event may be notified not only to the user but also to an administrator by email, etc.

In the exemplary embodiment, when some manipulation is performed on a take-out file or a file derived from the take-out file in the above-described manner, save-state information of the take-out file is updated and log information is collected, whereby the save-state of the take-out file and a manipulation performed on the file associated with the take-out file are grasped. Also, the term "save state" indicates a state where the take-out file is saved, such as a storage destination where the take-out file is saved and a file name used when the take-out file is saved. A save state of a file derived and created from the take-out file is also managed in association with the take-out file.

Next, a process performed when a take-out file is returned to a file provider will be described using a flowchart shown in FIG. 14. The process may be started such that a return instruction button or the like is provided and a return instruction manipulation is performed. A process of moving a take-out file to a take-out source may be considered to be a return manipulation.

It is noted that the process performed when a take-out file is returned to a file provider can, in other words, be a process of moving a file from a client terminal to a file provider. In the file provider, a file to be moved can be managed by a version managing unit or the like. When it can be determined that they are identical as a result of a comparison of a returned file with an obtained file, the returned file may be deleted by the file provider.

A process described below is repeatedly performed until take-out files corresponding to all entries of save-state information registered in the save-state information storage unit 31 are subjected to the process ("Y" at step S121). That is, in the return process, all files taken out to the client terminal 20 are collectively treated as a return target. If there is unprocessed save-state information ("N" at step S121), then the file returning unit 24 reads one piece of unprocessed save-state information (step S122). Meanwhile, when a take-out file has been edited by the client terminal 20, in order for the user to determine whether to return the edited take-out file to a file provider, in the exemplary embodiment, the user may be allowed to select whether to return the take-out file. Of course, a determination may be automatically made, e.g., when the take-out file has been edited, the take-out file is returned to the file provider.

If the user makes a selection to return a take-out file to a file provider ("Y" at step S123), then the file returning unit 24 obtains a corresponding take-out file from a storage destination by referring to the read save-state information, and transmits the take-out file to the file server 12 which is the file provider through the network 15, whereby the take-out file is moved (step S124). It is noted that when plural files are derived from a take-out file by copying, all the derived files may be returned. Alternatively, a screen for selecting a file may be displayed on the client terminal 20 and a file(s) selected by the user may be returned. It is noted that this operation is movement of a file and thus a take-out file that has been moved is deleted from the client terminal 20.

On the other hand, if the user makes a selection not to return a take-out file ("N" at step S123), then the file returning unit 24 deletes a corresponding take-out file by referring to the read save-state information (step S125). Then, the save-state managing unit 23 deletes a corresponding entry of save-state information from the save-state information storage unit 31 (step S126). The log processor 25 generates log information that includes: the manipulation date and time when the return manipulation of the file is performed; the file that is a manipulation target; and the content of a manipulation of returning or deleting the file, and then registers the log information in the log information storage unit 29, whereby a log is recorded (step S127). Finally, the updated save-state information in the client terminal 20 is transmitted to the file management server 13 and the save-state information is registered in the file attribute storage unit 133 (step S128). This operation may be the same as that at the aforementioned operation S118.

Figure 9:
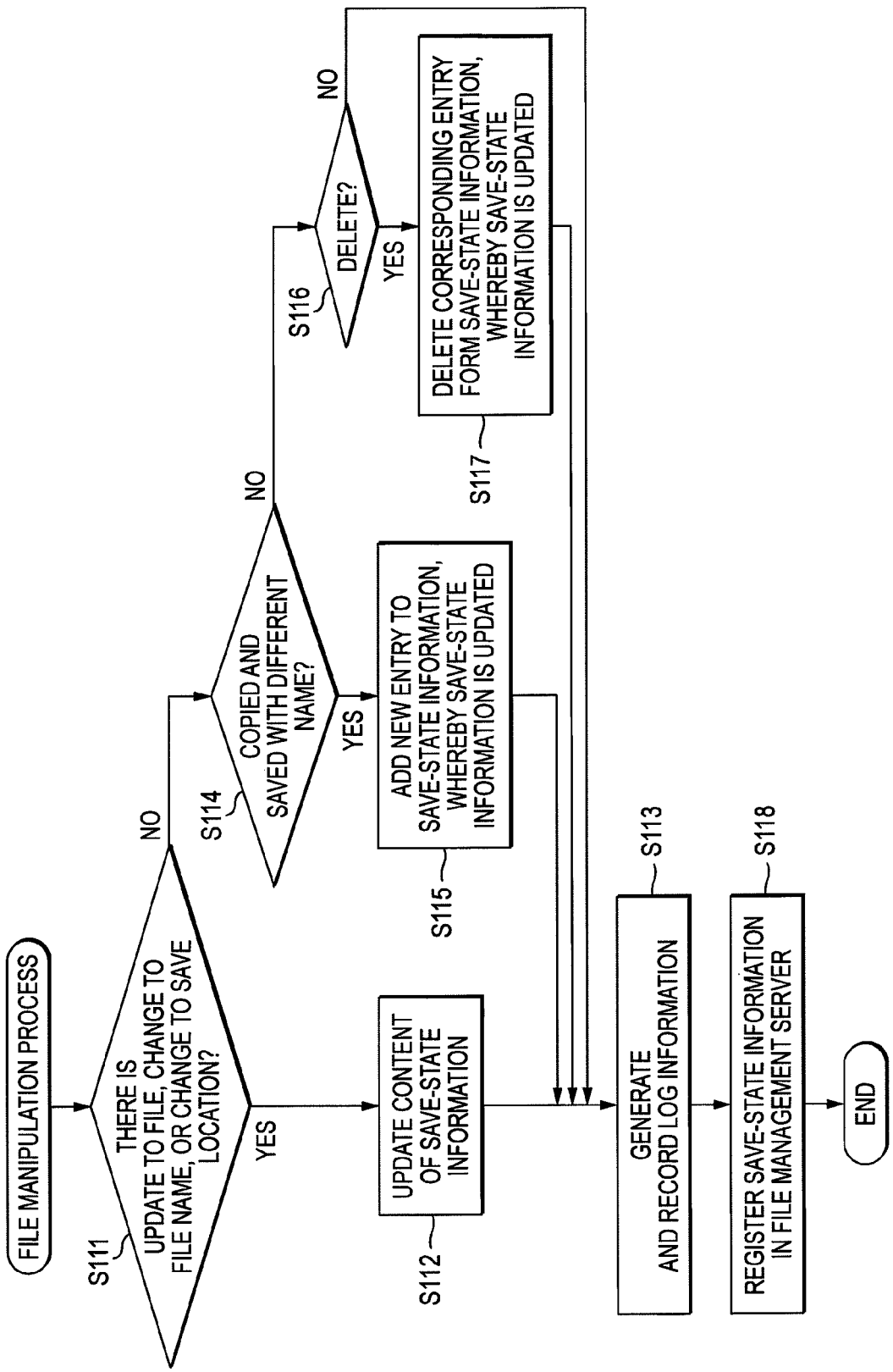
FIG. 9 is a flowchart showing a file manipulation process according to the exemplary embodiment.
Figure 14:
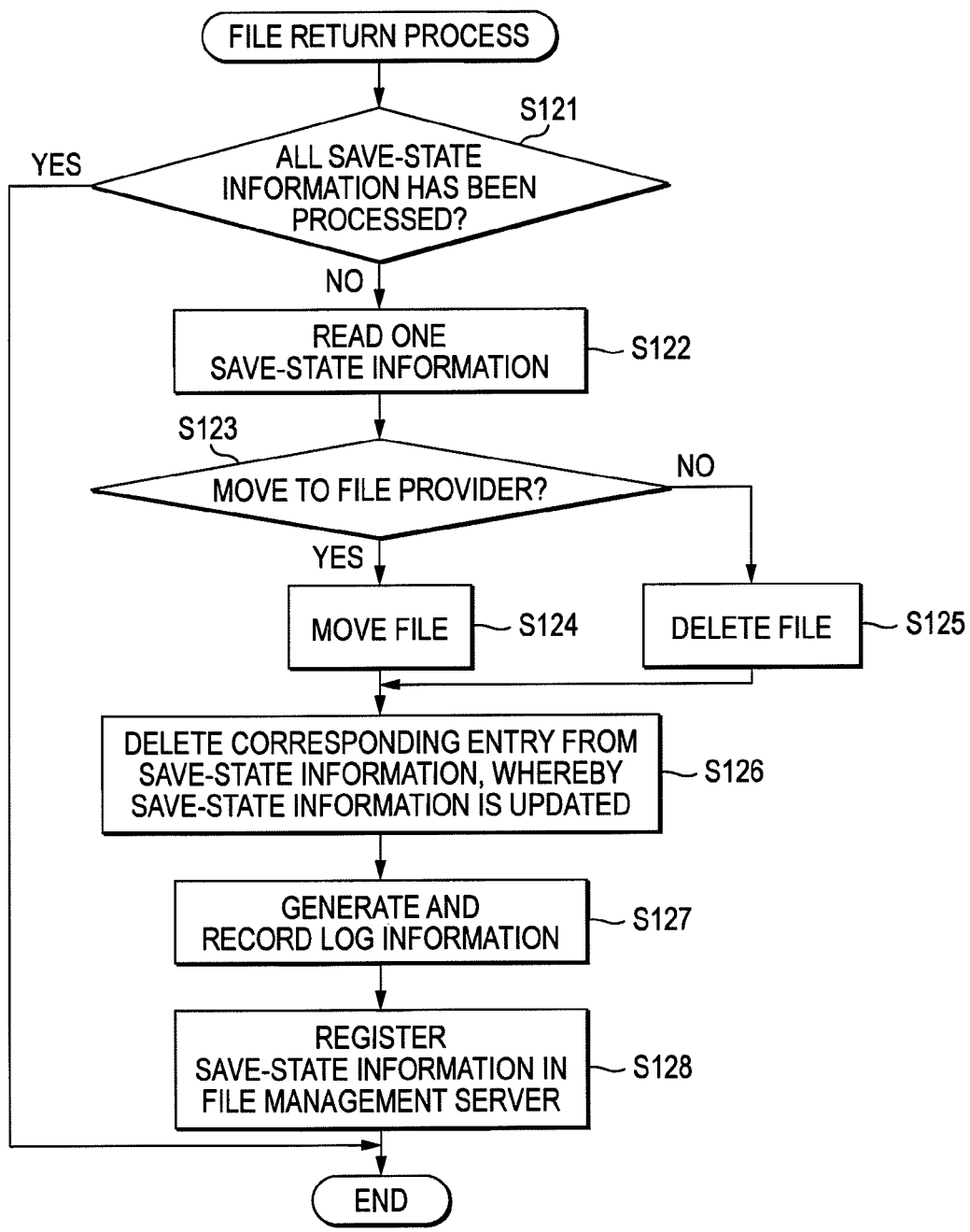
FIG. 14 is a flowchart showing a file return process according to the exemplary embodiment.

In the above description, a file manipulation process is described using FIG. 9 and a file return process is described using FIG. 14. Here, a flowchart of a file manipulation process in which a file return manipulation is considered to be one mode of a file manipulation is shown in FIG. 15. That is, FIG. 15 is a flowchart in which operations concerning the return of a file (Operations S131 and S132) are incorporated in FIG. 9. In FIG. 15, the same operations as those in FIG. 9 are denoted by the same operation numbers.

FIG. 14 shows a process in which all take-out files are collectively treated as a return target, whereas in FIG. 15, one selected take-out file is treated as a return target. Thus, if a save location has been changed ("Y" at step S111) and the changed save location is identical to a take-out source ("Y" at operation S131), then the manipulation can be considered to be a file return manipulation. Thus, the save-state managing unit 23 deletes an entry of save-state information corresponding to the returned take-out file (step S132). In the process flow in FIG. 15, as described in the description of FIG. 14, when there is a file that is associated through save-state information along with a file selected as a return target, the associated file can also be treated as a return target. Operations other than the above are the same as those in FIG. 9 and thus description thereof is omitted herein.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a processor comprising a central processing unit (CPU);
a file obtaining unit that obtains a first file from a file management apparatus that manages the first file;
a saving unit that saves the first file;
a save-state information storage unit that stores save-state information about a save state of the first file;
an accepting unit that accepts a manipulation performed on the first file saved in the saving unit;
an updating unit that, using the processor, updates the save-state information, when the save state of the first file is changed in response to the accepted manipulation;
a transmitting unit that transmits the save-state information from the information processing apparatus to the file management apparatus;
a moving unit; and
a selecting unit, wherein
in response to the updated first file determined to be moved to the file management apparatus, the selecting unit allows a user to select either moving or not moving to the file management apparatus a second file, which is associated with the first file by the save-state information, together with the first file, and
the moving unit moves the second file to the file management apparatus in accordance with the user's selection,
wherein when at least one of (i) the updated first file and (ii) the second file, which is associated with the first file by the save-state information, is to be moved to the file management apparatus, the moving unit moves to the file management apparatus all files, which are associated with the at least one of the first and second files by the save-state information, together with the at least one of the first and second files,
wherein the first file and the second file is a computer file stored in a directory of a folder.

2. The information processing apparatus according to claim 1, wherein the changing of the save state of the first file includes generating the second file.

3. The information processing apparatus according to claim 2, wherein the updating unit updates the save-state information so as to associate the generated second file with the updated first file.

4. The information processing apparatus according to claim 1, wherein
when the updated first file is to be moved to the file management apparatus, the moving unit moves to the file management apparatus the second file, which is associated with the first file by the save-state information, together with the first file.

5. The information processing apparatus according to claim 4, wherein
the changing of the save state of the first file includes generating the second file, and
the updating unit updates the save-state information so as to associate the generated second file with the updated first file.

6. The information processing apparatus according to claim 1, wherein
the changing of the save state of the first file includes generating the second file, and
the updating unit updates the save-state information so as to associate the generated second file with the updated first file.

7. The information processing apparatus according to claim 1, wherein
the changing of the save state of the first file includes generating the second file, and
the updating unit updates the save-state information so as to associate the generated second file with the updated first file.

8. The information processing apparatus according to claim 1, wherein
when at least one of (i) the obtained first file and (ii) the second file, which is associated with the first file by the save-state information, is to be moved to the file management apparatus, the selecting unit allows the user to select either moving or not moving to the file management apparatus all files, which are associated with the at least one of the first and second files by the save-state information, together with the at least one of the first and second files, and
if the user selects the moving of the all files, the moving unit moves the at least one of the first and second files and the all files to the file management apparatus.

9. The information processing apparatus according to claim 8, wherein
the changing of the save state of the first file includes generating the second file, and
the updating unit updates the save-state information so as to associate the generated second file with the updated first file.

10. The information processing apparatus according to claim 1, further comprising:
a receiving unit that receives information about whether the save-state information has been registered, from the file management apparatus; and
a determining unit that determines as to whether or not the manipulation performed on the file is allowed, based on the received information.

11. A file management system comprising:
a file management apparatus that manages a file; and
an information processing apparatus that obtains and saves the file, wherein the information processing apparatus includes
a processor comprising a central processing unit (CPU);
a file obtaining unit that obtains the file from the file management apparatus,
a saving unit that saves the file,
a save-state information storage unit that stores save-state information about a save state of the file,
an accepting unit that accepts a manipulation performed on the file saved in the saving unit,
an updating unit that, using the processor, updates the save-state information, when the save state of the file is changed in response to the accepted manipulation, and
a transmitting unit that transmits the save-state information from the information processing apparatus to the file management apparatus;
a moving unit; and
a selecting unit, and
the file management apparatus includes
a receiving unit that receives the save-state information; and
a managing unit that manages the save-state information in association with the file, wherein
in response to the updated first file determined to be moved to the file management apparatus, the selecting unit allows a user to select either moving or not moving to the file management apparatus a second file, which is associated with the first file by the save-state information, together with the first file, and the moving unit moves the second file to the file management apparatus in accordance with the user's selection, wherein when at least one of (i) the updated first file and (ii) the second file, which is associated with the first file by the save-state information, is to be moved to the file management apparatus, the moving unit moves to the file management apparatus all files, which are associated with the at least one of the first and second files by the save-state information, together with the at least one of the first and second files, wherein the first file and the second file is a computer file stored in a directory of a folder.

12. The file management system according to claim 11, wherein the changing of the save state of the first file includes generating the second file.

13. The file management system according to claim 12, wherein the updating unit updates the save-state information so as to associate the generated second file with the updated first file.

14. An information processing method comprising:
a client terminal obtaining a file from a file management apparatus that manages the file;
saving the file in the client terminal;
storing in the client terminal save-state information about a save state of the file;
accepting a manipulation performed on the file;
updating the save-state information by using a processor comprising a central processing unit (CPU), when the save state of the file is changed in response to the accepted manipulation; and
transmitting the save-state information from the client terminal to the file management apparatus, wherein
in response to the updated first file determined to be moved to the file management apparatus, allowing a user to select either moving or not moving to the file management apparatus a second file, which is associated with the first file by the save-state information, together with the first file, and
moving the second file to the file management apparatus in accordance with the user's selection,
wherein when at least one of (i) the updated first file and (ii) the second file, which is associated with the first file by the save-state information, is to be moved to the file management apparatus, the moving unit moves to the file management apparatus all files, which are associated with the at least one of the first and second files by the save-state information, together with the at least one of the first and second files,
wherein the first file and the second file is a computer file stored in a directory of a folder.

15. The information processing method according to claim 14, wherein
the changing of the save state of the first file includes generating the second file, and
the updating updates the save-state information so as to associate the generated second file with the updated first file.

16. A non-transitory computer readable medium storing a program causing a computer to execute an information process, the information process comprising:
a client terminal obtaining a file from a file management apparatus that manages the file;
saving the file in the client terminal;
storing in the client terminal save-state information about a save state of the file;
accepting a manipulation performed on the file;
updating the save-state information, when the save-state of the file is changed in response to the accepted manipulation; and
transmitting the save-state information from the client terminal to the file management apparatus, wherein
in response to the updated first file determined to be moved to the file management apparatus, allowing a user to select either moving or not moving to the file management apparatus a second file, which is associated with the first file by the save-state information, together with the first file, and
moving the second file to the file management apparatus in accordance with the user's selection,
wherein when at least one of (i) the updated first file and (ii) the second file, which is associated with the first file by the save-state information, is to be moved to the file management apparatus, the moving unit moves to the file management apparatus all files, which are associated with the at least one of the first and second files by the save-state information, together with the at least one of the first and second files,
wherein the first file and the second file is a computer file stored in a directory of a folder.

17. The non-transitory computer readable medium according to claim 16, wherein
the changing of the save state of the first file includes generating the second file, and
the updating updates the save-state information so as to associate the generated second file with the updated first file.

* * * * *